United States Patent Office 3,372,168
Patented Mar. 5, 1968

3,372,168
10,10-LOWER ALKYL-9-[1-LOWER ALKYL-PYRROL-IDINES (3)] - 9,10 - DIHYDRO - ANTHRACENES AND 9-HYDROXY DERIVATIVES THEREOF
Ernst Jucker, Ettingen, Anton Ebnöther, Reinach, Basel-Land, and Andre Stoll, Birsfelden, Switzerland, assignors to Sandoz Ltd., Basel, Switzerland
No Drawing. Filed June 2, 1965, Ser. No. 460,838
Claims priority, application Switzerland, July 7, 1964, 8,912/64
6 Claims. (Cl. 260—326.5)

ABSTRACT OF THE DISCLOSURE

Compounds of formula

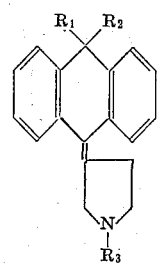

in which $R_1$, $R_2$ and $R_3$ are an alkyl radical containing between 1 and 3 carbon atoms and their acid addition salts, are useful as antidepressants. The dosage is 10–200 mg. per day orally, that is, 0.15–3 mg./kg. of body weight.

---

The present invention relates to new carbocyclic compounds and a process for their production.

The present invention provides 9,10-dihydro-anthracene derivatives of Formula I,

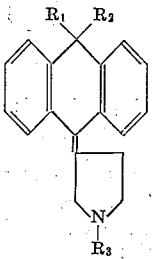
I in which each of $R_1$, $R_2$ and $R_3$ signifies an alkyl radical containing from 1 to 3 carbon atoms inclusive, and their acid addition salts.

The present invention further provides a process for the production of Compounds I and their acid addition salts, characterized in that the elements of water are split off from a compound of Formula V,

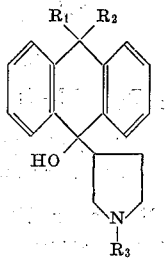
V in which $R_1$, $R_2$ and $R_3$ have the above significance, and, when an acid addition salt is required, the resulting compound of Formula I is reacted with an organic or inorganic acid.

The compounds of Formula V may be obtained by decomposing the reaction product resulting by reducing a compound of Formula IV,

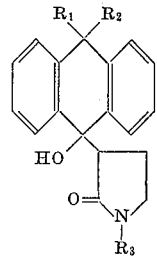
IV in which $R_1$, $R_2$ and $R_3$ have the above significance, with lithium aluminium hydride or diborane in an inert organic solvent.

The compounds of Formula IV may be produced by reacting a compound of Formula II,

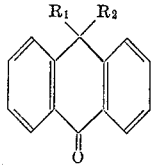
II in which $R_1$ and $R_2$ have the above significance, with a pyrrolidone-(2) derivative of Formula III,

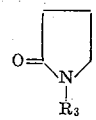
III in which $R_3$ has the above significance, in the presence of an alkali metal amide in an inert solvent medium.

The present invention also provides the compounds of Formula V and their acid addition salts as well as the compounds of Formula IV.

One method of producing the compounds of Formula I and their acid addition salts may be effected as follows:

An anthrone-(9) derivative of Formula II, e.g., 10,10-dimethyl-anthrone-(9), dissolved in an inert solvent therefor, e.g., tetrahydrofuran, is added while stirring at 0–5° C. to a suspension of an alkali metal amide, e.g., lithium, sodium or potassium amide, in 1-methyl-pyrrolidone-(2). After stirring for approximately 1 to 1½ hours, first at 0° C. and then at about 20–25° C., the reaction mixture is stirred with ice water and a solvent suitable for extraction, e.g., diethyl ether or dichloromethane. The compound of Formula IV obtained in this way is then isolated and purified in manner known per se. The reduction of the Compound IV is effected with lithium aluminium hydride or diborane in an inert organic solvent, e.g., tetrahydrofuran. The reaction complex is subsequently decomposed, the inorganic compounds are filtered off and the reduction product of Formula V is isolated from the filtrate in manner known per se; it may be purified by crystallization and optionally converted into an acid addition salt. When lithium aluminium hydride is used the decomposition is effected in the usual manner, e.g., with an aqueous saline solution, while when diborane is used the decomposition is effected with a mineral acid. The splitting off of the elements of water from the compound of Formula V may, for example, be effected by heating with a mineral acid, a strong organic acid or another agent for splitting off water, e.g., thionyl chloride, phosphorus oxychloride, zinc chloride or glacial acetic acid/acetic anhydride. The resulting compound of Formula I is isolated from the reaction mixture and may be purified by crystallization and/or by conversion into an acid addition salt. Examples of acids for acid addition salt formation with Compounds I and V are: hydrochloric, hydrobromic, phosphoric, sulphuric, acetic, malonic, fumaric, maleic, tartaric, hexahydrobenzoic and p-toluenesulphonic acid.

Compounds of Formula I and their acid addition salts have valuable pharmacodynamic properties, e.g., by effects which are typical of antidepressives. In animal tests they exhibit inter alia an inhibition of the vegetative and motor symptoms caused by reserpine or tetrabenazine, a potentiation of the effect of noradrenaline and certain sedative and anticholinergic effects. The antidepressive effect is specific while the neuroleptic properties are of secondary importance. The toxicity of the compounds of Formula I and their acid addition salts is relatively low.

The compounds of Formula I are indicated for use in the treatment of neurotic and psychotic disorders, especially depressive conditions; they are also indicated for use in the therapy of psychosomatic disorders. They are preferably administered in the form of their physiologically acceptable, water-soluble salts. A suitable unit dosage has been found to be 10 to 200 mg. per day administereed per os.

The compounds of Formula I may be used as pharmaceuticals on their own or in the form of appropriate medicinal preparations for administration, e.g., orally, enterally or parenterally. In order to produce suitable medicinal preparations the compounds are worked up with organic or inorganic adjuvants which are inert and physiologically acceptable. Examples of such adjuvants are as follows: for tablets and dragées: lactose, starch, talc and stearic acid; for injectable solutions: water, alcohols, glycerin and vegetable oils; for suppositories: natural or hardened oils and waxes. The preparations may furthermore contain suitable preserving, stabilizing and wetting agents, solubilizers, sweetening and coloring substances and flavorings.

The present invention also provides pharmaceutical compositions containing, in addition to an inert, physiologically acceptable carrier, a compound of Formula I above and/or an acid addition salt thereof.

The term "in manner known per se" as utilized herein designates methods in use or described in the literature on the subject.

In the following non-limitative example all temperatures are indicated in degrees centigrade and are uncorrected.

EXAMPLE (a) *9-hydroxy-10,10-dimethyl-9-[1-methyl-2-oxo-pyrrolidinyl-(3)]-9,10-dihydro-anthracene*

A solution of 9.45 g. of 10,10-dimethylanthrone-(9) in 20 cc. of tetrahydrofuran is added dropwise while stirring at 0–5° to a suspension of 5.4 g. of pulverized sodium amide in 25 cc. of 1-methylpyrrolidone-(2). After stirring for 30 minutes at 0° and for 45 minutes at 20–25° the reaction mixture is poured into 300 cc. of ice cold water and after the addition of 200 cc. of ether the mixture is stirred for a further 10 minutes, the ethereal layer is separated and washed several times with water. The residue obtained after drying the ethereal solution over sodium sulphate and evaporating is recrystallized from isopropanol and from ethanol. Melting point 118–120°.

(b) *9-hydroxy-10,10-dimethyl-9-[1-methyl-pyrrolidinyl-(3)]-9,10-dihydro-anthracene*

A solution of 7.70 g. of 9-hydroxy-10,10-dimethyl-9-[1-methyl-2-oxopyrrolidinyl-(3)]9,10-dihydroanthracene in 30 cc. of tetrahydrofuran is added dropwise while stirring at 5–10° to a suspension of 1.53 g. of lithium aluminum hydride in 30 cc. of absolute tetrahydrofuran. The reaction mixture is subsequently heated to the boil at reflux for 2 hours, cooling is effected and 8–13 cc. of a saturated sodium sulphate solution are added dropwise while cooling well. The resulting precipitate is filtered off and boiled several times with tetrahydrofuran. The combined tetrahydrofuran filtrates are evaporated and the residue crystallized from benzene. Melting point 196.5–197.5°.

(c) *10,10-dimethyl-9-[1-methyl-pyrrolidinylidene-(3)]-9,10-dihydro-anthracene*

5.0 g. of 9-hydroxy-10,10-dimethyl-9-[1-methyl-pyrrolidinyl-(3)]-9,10-dihydro-anthracene in 70 cc. of glacial acetic acid and 20 cc. of concentrated hydrochloric acid are heated to the boil at reflux for one hour. The reaction mixture is subsequently evaporated in a vacuum and the resulting hydrochloride is recrystallized from methanol. Melting point 280–285° (decomposition).

What is claimed is:

1. A compound selected from the group consisting of compounds of formula:

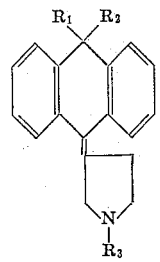

in which each of $R_1$, $R_2$ and $R_3$ signifies alkyl of 1 to 3 carbon atoms inclusive, and their pharmaceutically acceptable non-toxic acid addition salts.

2. 10,10 - dimethyl-9-[1-methyl-pyrrolidinylidene-(3)]-9,10-dihydro-anthracene.

3. A compound selected from the group consisting of compounds of formula

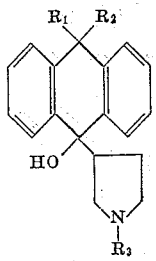

in which each of $R_1$, $R_2$ and $R_3$ is alkyl of 1 to 3 carbon atoms inclusive, and their pharmaceutically acceptable non-toxic acid addition salts.

4. 9 - hydroxy-10,10-dimethyl-9-[1-methyl-pyrrolidinyl-(3)]-9,10-dihydro-anthracene.

5. A compound selected from the group consisting of compounds of formula:

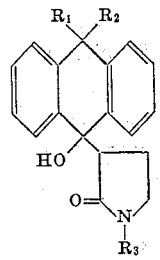

in which each of $R_1$, $R_2$ and $R_3$ is alkyl of 1 to 3 carbon atoms inclusive.

6. 9 - hydroxy-10,10-dimethyl-9-[1-methyl-2-oxo-pyrrolidinyl-(3)]-9,10-dihydro-anthracene.

References Cited

UNITED STATES PATENTS 3,177,209   4/1965   Holm _____ 260—240

NICHOLAS S. RIZZO, *Primary Examiner.*

J. TOVAR, *Assistant Examiner.*